US009857969B2

(12) United States Patent
Fujimori (10) Patent No.: US 9,857,969 B2
(45) Date of Patent: Jan. 2, 2018

(54) DISPLAY APPARATUS, DISPLAY CONTROL METHOD, AND COMPUTER PROGRAM

(71) Applicant: SEIKO EPSON CORPORATION, Tokyo (JP)

(72) Inventor: Toshiki Fujimori, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 8 days.

(21) Appl. No.: 15/050,535

(22) Filed: Feb. 23, 2016

(65) Prior Publication Data

US 2016/0252984 A1 Sep. 1, 2016

(30) Foreign Application Priority Data

Feb. 27, 2015 (JP) ................. 2015-037854

(51) Int. Cl.
*G09G 5/00* (2006.01)
*G06F 3/0488* (2013.01)
*G06F 3/041* (2006.01)

(52) U.S. Cl.
CPC ........ *G06F 3/04883* (2013.01); *G06F 3/0416* (2013.01); *G06F 3/0488* (2013.01); *G06F 2203/041* (2013.01)

(58) Field of Classification Search
CPC .... G06F 3/0416; G06F 3/033; G06F 3/03545; G06F 3/038; G06F 3/0383; G06F 3/04883; G06F 2203/041; G06F 3/017; G06F 2203/04808; G06F 3/0488
USPC ............................. 345/15–158, 173; 715/863
See application file for complete search history.

(56) References Cited

U.S. PATENT DOCUMENTS

| 9,041,695 B2 | 5/2015 | Ichieda |
| 2010/0225602 A1* | 9/2010 | Fujimura ................. G06F 3/038 345/173 |
| 2011/0234516 A1* | 9/2011 | Nakajima ........... G06F 3/04883 345/173 |
| 2013/0162607 A1 | 6/2013 | Ichieda |

(Continued)

FOREIGN PATENT DOCUMENTS

| JP | 2005-092538 A | 4/2005 |
| JP | 2008-116874 A | 5/2008 |

(Continued)

*Primary Examiner* — Jennifer Nguyen
(74) *Attorney, Agent, or Firm* — Oliff PLC (57) ABSTRACT

A display apparatus includes a display section configured to display, on a display surface, a screen of an application program running on an information processing apparatus, a detecting section configured to detect the position of a pointer, a receiving section configured to receive a determination result concerning whether the position is present within a predetermined range including an image object, a drawing section configured to draw, when an operation mode is a first mode, a line corresponding to a track of the position, a second transmitting section configured to transmit, when the operation mode is a second mode, the information indicating the position to the information processing apparatus, and a switching section configured to switch, when the operation mode is the first mode, the operation mode to the second mode when the receiving section receives the determination result indicating that the position is within the predetermined range.

11 Claims, 7 Drawing Sheets

(56) References Cited

U.S. PATENT DOCUMENTS

2014/0300606 A1* 10/2014 Nakada ................ G06T 11/203
                                                              345/441

FOREIGN PATENT DOCUMENTS

| JP | 4208681 B2 | 1/2009 |
| JP | 2013-134409 A | 7/2013 |

* cited by examiner

DISPLAY APPARATUS, DISPLAY CONTROL METHOD, AND COMPUTER PROGRAM

The entire disclosure of Japanese Patent Application No. 2015-037854, filed Feb. 27, 2015 is expressly incorporated by reference herein.

BACKGROUND

1. Technical Field

The present invention relates to a technique for switching operation modes of a display apparatus that performs different kinds of processing in a first mode and a second mode according to the position of a pointer.

2. Related Art

There is known a display apparatus that displays an image corresponding to a position pointed by a pointer on a display surface. For example, JP-A-2013-134409 (Patent Literature 1) describes a projector that projects an image corresponding to a position pointed by a pointer to be superimposed on an image supplied from a video supply apparatus (a PC). Operation modes of the projector include an operation mode in which the projector draws an image according to a coordinate of the pointer and an operation mode in which the PC draws an image using the coordinate of the pointer as a coordinate of a pointing device. In Patent Literature 1, the two operation modes are switched according to operation on a displayed menu bar. In Patent Literature 1, the two operation modes are switched according to operation on a displayed menu bar. JP-A-2005-92538 (Patent Literature 2) mentions that, in a display apparatus including a touch panel, an operation mode is switched according to a drag length (length of movement from a touch point on a screen to a detach point from the screen).

In the technique described in Patent Literature 1, a user needs to perform operation for causing the projector to display a menu and selecting an item equivalent to the switching of the operation modes out of the menu. Whether the user intends to perform the switching of the operation modes sometimes depends on an image object displayed by the video supply apparatus in the position pointed by the pointer. However, this point is not taken into account in the technique described in Patent Literature 2.

SUMMARY

An advantage of some aspects of the invention is to provide a technique for automatically switching operation modes of a display apparatus reflecting the intention of a user more irrespective of display and selection of a menu.

An aspect of the invention provides a display apparatus including: a display section configured to display, on a display surface, a screen of an application program running on an information processing apparatus; a detecting section configured to detect the position of a pointer on the display surface; a first transmitting section configured to transmit an inquiry including information indicating the position detected by the detecting section to the information processing apparatus; a receiving section configured to receive, as a reply to the inquiry, a determination result concerning whether the position is present within a predetermined range including an image object for performing an input to the application program on the screen; a drawing section configured to draw, when an operation mode of the display apparatus is a first mode, on the display surface, a line corresponding to a track of the position detected by the detecting section; a second transmitting section configured to transmit, when the operation mode is a second mode, the information indicating the position detected by the detecting section to the information processing apparatus; and a switching section configured to switch, when the operation mode is the first mode, the operation mode to the second mode when the receiving section receives the determination result indicating that the position detected by the detecting section is within the predetermined range.

With the display apparatus, it is possible to automatically switch the operation mode of the display apparatus to the second mode reflecting the intention of a user more irrespective of display and selection of a menu.

The detecting section may detect a first event indicating that the pointer is in contact with the display surface, and the drawing section may draw the line according to a track of the position during continuous detection of the first event, start the drawing of the like before the receiving section receives the reply, and erase the line when the receiving section receives the determination result indicating that the position detected by the detecting section is within the predetermined range and when the length of the line is smaller than a threshold.

According to the display apparatus with this configuration, it is possible to erase a line drawn against the intention of the user.

The detecting section may detect a first event indicating that the pointer is in contact with the display surface, and the drawing section may draw the line according to a track of the position during continuous detection of the first event, not start the drawing of the like before the receiving section receives the reply, and draw at least a part of the line when the length of the line is larger than a threshold.

According to the display apparatus with this configuration, it is possible to, while preventing a line from being drawn by operation performed on the image object by the user, draw a line when the user intends to draw the line.

When the length of the line is larger than the threshold, the drawing section may return to a point where the first event is detected first concerning the line and draw the line.

According to the display apparatus with this configuration, it is possible to return to a start point and draw a line when the user intends to draw the line.

The detecting section may detect a second event indicating that the pointer in contact with the display surface is separated from the display surface, and the first transmitting section may transmit the inquiry when the second event is detected by the detecting section and, even when the second event is detected by the detecting section, not transmit the inquiry when the length of the line is larger than a threshold at a point in time of the detection.

According to the display apparatus with this configuration, it is possible to reduce a frequency of occurrence of waiting time due to the inquiry.

The first transmitting section may not transmit the inquiry before a threshold time elapses after the operation mode is switched to the second mode.

According to the display apparatus with this configuration, it is possible to reduce the frequency of occurrence of waiting time due to the inquiry.

The detecting section may detect a first event indicating that the pointer is in contact with the display surface, and the switching section may switch, when the operation mode is the second mode, the operation mode to the first mode when the length of a track of the position during continuous detection of the first event is larger than a threshold.

According to the display apparatus with this configuration, it is possible to automatically switch the operation mode of the display apparatus to the first mode reflecting the intention of the user more irrespective of display and selection of a menu.

The detecting section may detect a third event indicating that the pointer is away from the display surface and the distance between the pointer and the display surface is a threshold or less, and the first transmitting section may transmit the inquiry when the third event is detected by the detecting section.

According to the display apparatus with this configuration, it is possible to reduce waiting time experienced by the user.

The display apparatus according to the aspect may further include a notifying section configured to notify a user that the operation mode is switched.

According to the display apparatus with this configuration, the user can easily confirm that the operation mode is switched.

Another aspect of the invention provides a display control method including: displaying, on a display surface, a screen of an application program running on an information processing apparatus; detecting the position of a pointer on the display surface; transmitting an inquiry including information indicating the detected position to the information processing apparatus; receiving, as a reply to the inquiry, a determination result concerning whether the position is present within a predetermined range including an image object for performing an input to the application program on the screen; drawing, when an operation mode of the display apparatus is a first mode, on the display surface, a line corresponding to a track of the detected position; transmitting, when the operation mode is a second mode, the information indicating the detected position to the information processing apparatus; and switching, when the operation mode is the first mode, the operation mode to the second mode when the determination result indicating that the detected position is within the predetermined range is received.

According to the display control method, it is possible to automatically switch the operation mode of the display apparatus to the second mode reflecting the intention of the user more irrespective of display and selection of a menu.

Still another aspect of the invention provides a computer program for causing a computer to execute the steps of: displaying, with a display apparatus, on a display surface, a screen of an application program running on the computer; acquiring the position of a pointer on the display surface; determining whether the position is present within a predetermined range including a first image object for performing an input to the application program on the screen; drawing, when an operation mode of the display apparatus is a first mode, on the display surface, a line corresponding to a track of the detected position; displaying, when the operation mode is a second mode, a second image object in the detected position; and switching, when the operation mode is the first mode, the operation mode to the second mode when it is determined that the detected position is within the predetermined range.

According to the computer program, it is possible to automatically switch the operation mode of the display apparatus to the second mode reflecting the intention of the user more irrespective of display and selection of a menu.

BRIEF DESCRIPTION OF THE DRAWINGS

The invention will be described with reference to the accompanying drawings, wherein like numbers reference like elements.

DESCRIPTION OF EXEMPLARY EMBODIMENTS

1. Configuration

Figure 1:
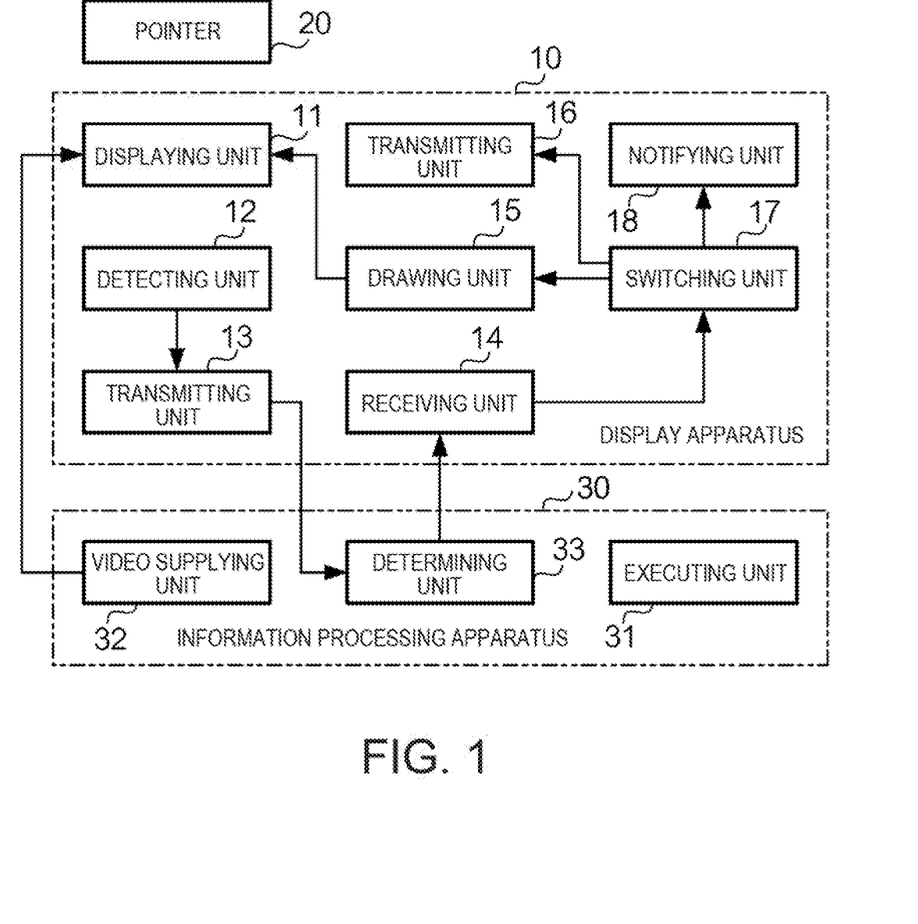
FIG. 1 is a diagram showing the functional configuration of a display system according to an embodiment.

FIG. 1 is a diagram showing the functional configuration of a display system 1 according to an embodiment. The display system 1 includes a display apparatus 10, a pointer 20, and an information processing apparatus 30. The display apparatus 10 is an apparatus that displays a video supplied from the information processing apparatus 30 on a display surface. The information processing apparatus 30 is an example of a video supply apparatus that supplies a video to the display apparatus 10. In this example, the information processing apparatus 30 is a general-purpose personal computer. The information processing apparatus 30 has a function of causing an application program to run.

The pointer 20 is a device that points a position on the display surface. The display apparatus 10 performs processing corresponding to the position pointed by the pointer 20. In this example, the processing corresponding to the pointed position is different depending on an operation mode of the display apparatus 10. The display system 1 has a function of automatically switching the operation mode.

The display apparatus 10 includes a displaying unit 11, a detecting unit 12, a transmitting unit 13, a receiving unit 14, a drawing unit 15, a transmitting unit 16, a switching unit 17, and a notifying unit 18.

The displaying unit 11 displays, on the display surface, a screen of the application program running on the information processing apparatus 30. The screen of the application program means a screen generated in the information processing apparatus 30 according to execution of the application program. For example, in the case of a GUI (Graphical User Interface) of a multi-window, the screen of the application program means an entire desktop screen including a window of an active application program. The display surface is a surface on which an image is displayed. For example, when the display apparatus 10 is a projector, the display surface is a projection screen or a wall surface. When the display apparatus 10 is a liquid crystal display, the display surface is a liquid crystal panel.

The detecting unit 12 detects the position of the pointer 20 on the display surface (hereinafter simply referred to as "position of the pointer 20"). In this example, the detecting unit 12 detects an event including the position of the pointer 20. The pointer 20 is used by a user to designate a position on the display surface. The pointer 20 is, for example, an electronic pen or a finger of the user. The detecting unit 12 includes, for example, a camera that picks up an image of the display surface. The detecting unit 12 detects the position of the pointer 20 according to a shape or a color of the pointer 20 or light emission of a light emitting body (e.g., an infrared light emitting diode) provided in the pointer 20. The detecting unit 12 may detect the position of the pointer 20 with a pressure sensor or an electrostatic sensor provided on the display surface. The detecting unit 12 recognizes a type of an event, for example, according to light emission pattern of the light emitting body.

Events related to the pointer 20 include, for example, a pen-down event and a pen-up event. The pen-down event is an event indicating that the pointer 20 is in contact with the display surface. The pen-down event includes information (e.g., a coordinate) indicating a position where the pointer 20 is in contact with the display surface. The pen-up event is an event indicating that the pointer 20 in contact with the display surface is separated from the display surface. The pen-up event includes information indicating a position where contact is detected last before the pointer 20 in contact with the display surface is separated from the display surface.

The transmitting unit 13 transmits an inquiry to the information processing apparatus 30. The inquiry is an inquiry concerning whether the position of the pointer 20 detected by the detecting unit 12 is a position equivalent to a UI (User Interface) object. The UI object means an image object for, on a screen of an application program running on the information processing apparatus 30, performing an input to the application program. The UI object is, for example, an icon, a button, and a menu item. The position equivalent to the UI object means a predetermined range including the UI object (e.g., a range obtained by adding a predetermined margin to the external shape of the UI object; an example of a first region). Note that the inquiry includes the information indicating the position of the pointer 20.

The receiving unit 14 receives a reply to the inquiry. The reply includes a determination result concerning whether the position of the pointer 20 is the position equivalent to the UI object.

The drawing unit 15 is a function enabled when the operation mode of the display apparatus 10 is a first mode. The drawing unit 15 draws, on the display surface, a line (i.e., a handwritten image) corresponding to a track of the position of the pointer 20. In this example, the drawing unit 15 draws a line according to a track of the position of the pointer 20 during continuous detection of the pen-down event. More specifically, the drawing unit 15 draws a line according to a position where the pen-down event is detected for the first time in a state in which the pen-down event is not detected to a position where the pen-up event is detected later.

The transmitting unit 16 is a function enabled when the operation mode of the display apparatus 10 is a second mode. The transmitting unit 16 transmits information indicating the position of the pointer 20 to the information processing apparatus 30. Note that the drawing unit 15 may not draw a line corresponding to a track of the position of the pointer 20 detected during the second mode or may draw a line only when a specific condition is satisfied.

The switching unit 17 switches the operation mode of the display apparatus 10. Specifically, when the operation mode of the display apparatus 10 is the first mode, the switching unit 17 switches the operation mode to the second mode when the receiving unit 14 receives a reply including a determination result indicating that the position of the pointer 20 is the position equivalent to the UI object.

The notifying unit 18 notifies the user that the operation mode is switched. The notification to the user is performed via, for example, sound, vibration, or an image displayed on the display surface.

The information processing apparatus 30 includes an executing unit 31, a video supplying unit 32, and a determining unit 33. The executing unit 31 executes a computer program. The video supplying unit 32 supplies a video to the display apparatus 10. In this example, the video supplying unit 32 supplies a screen of the computer program executed by the executing unit 31. The determining unit 33 determines, in response to an inquiry from the display apparatus 10, whether a position related to the inquiry is a position equivalent to a UI object of the computer program executed by the executing unit 31. Further, the determining unit 33 transmits a determination result to the display apparatus 10.

Figure 2:
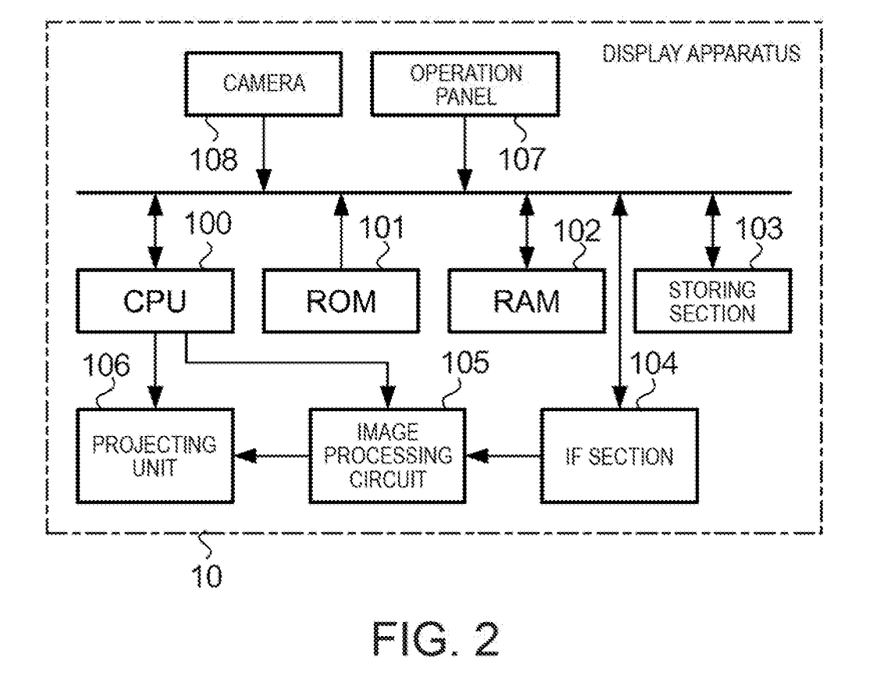
FIG. 2 is a diagram illustrating the hardware configuration of a display apparatus.

FIG. 2 is a diagram illustrating the hardware configuration of the display apparatus 10. The display apparatus 10 includes a CPU (Central Processing Unit) 100, a ROM (Read Only Memory) 101, a RAM (Random Access Memory) 102, a storing section 103, an IF section 104, an image processing circuit 105, a projecting unit 106, an operation panel 107, and a camera 108.

The CPU 100 is a control device that controls the sections of the display apparatus 10. The ROM 101 is a nonvolatile storage device having stored therein various computer programs and data. The RAM 102 is a volatile storage device that stores data. The RAM 102 functions as a work area used by the CPU 100 in executing processing. The storing section 103 is a nonvolatile storage device that stores data, computer programs, and the like. The storing section 103 includes, for example, a flash ROM, an SSD (Solid State Drive), or an HDD (Hard Disk Drive). Note that the storing section 103 may be included in the ROM 101. Alternatively, the storing section 103 may be a storage device on a network.

The IF section 104 is an interface that mediates exchange of signals or data with an external apparatus (e.g., the information processing apparatus 30). The IF section 104 includes terminals (e.g., a VGA terminal, a USB terminal, a wired LAN interface, an S terminal, an RCA terminal, an HDMI (High-Definition Multimedia Interface: registered trademark) terminal, and a microphone terminal) and a wireless LAN interface for exchanging signals or data with the external apparatus. The terminals may include a video output terminal in addition to a video input terminal.

The image processing circuit 105 applies predetermined image processing (e.g., a size change and keystone correction) to a video signal input thereto (hereinafter referred to as "input video signal").

The projecting unit 106 projects an image on a projection surface such as a projection screen or a wall surface according to the video signal applied with the image processing. The projecting unit 106 includes a light source, a light modulator, and an optical system (all of which are not shown in the figure). The light source includes a lamp such as a high-pressure mercury lamp, a halogen lamp, or a metal halide lamp or a solid-state light source such as an LED (Light Emitting Diode) or a laser diode and a driving circuit for the lamp or the solid-state light source. The light modulator is a device that modulates, according to the video signal, light radiated from the light source. The light modulator includes, for example, a liquid crystal panel or a DMD (Digital Mirror Device) and a driving circuit for the liquid crystal panel or the DMD. Note that the liquid crystal panel may be either a transmission type or a reflection type. The optical system is configured by, for example, an element that projects the light modulated by the light modulator on the projection screen. The optical system includes, for example, a mirror, a lens, and a prism. The light source and the light modulator may be provided for each color component.

The operation panel 107 is an input device with which the user inputs an instruction to the display apparatus 10. The operation panel 107 includes, for example, a keypad, buttons, or a touch panel.

The camera 108 is a camera for specifying the position of the pointer 20. In this example, the pointer 20 includes a light emitting body (e.g., an infrared light emitting diode), a pressure sensor, and a control circuit (all of which are not shown in the figure) at a pen nib. When the pressure sensor detects contact of the pen nib with an object (the projection surface, etc.), the control circuit causes the light emitting body to emit light in a predetermined light emission pattern. The camera 108 is an infrared camera. The camera 108 photographs an image of the projection surface. The CPU 100 specifies the position of the pointer 20 and an event corresponding to the pointer 20 from the image photographed by the camera 108.

In this example, the projecting unit 106 is an example of the displaying unit 11. The projection surface is the display surface. The camera 108 and the CPU 100 are examples of the detecting unit 12. The IF section 104 is an example of the transmitting unit 13, the receiving unit 14, and the transmitting unit 16. The CPU 100 is an example of the drawing unit 15, the switching unit 17, and the notifying unit 18.

Figure 3:
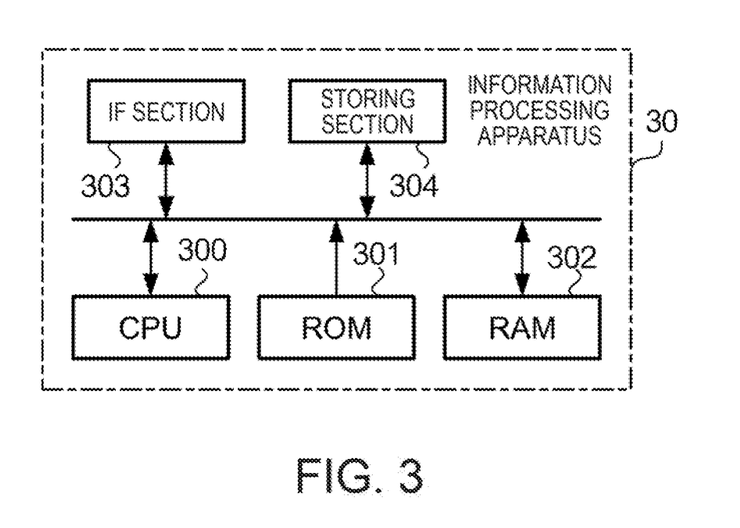
FIG. 3 is a diagram illustrating the hardware configuration of an information processing apparatus.

FIG. 3 is a diagram illustrating the hardware configuration of the information processing apparatus 30. The information processing apparatus 30 is, for example, a general-purpose personal computer. The information processing apparatus 30 includes hardware elements such as a CPU 300, a ROM 301, a RAM 302, an IF section 303, and a storing section 304. The storing section 304 stores, in addition to an operating system (OS) and an application program (e.g., a computer program for sequentially displaying slides of presentation), a computer program for replying an inquiry from the display apparatus 10 (hereinafter referred to as "position determining program"). The position determining program runs on the background of the application program. In the information processing apparatus 30, the CPU 300 is an example of the executing unit 31 and the determining unit 33. The IF section 303 is an example of the video supplying unit 32.

2. Overview of the Operation Modes

The operation modes of the display apparatus 10 are explained. In this example, the operation modes of the display apparatus 10 include an interactive mode (an example of the first mode) and a PC mode (an example of the second mode).

Figure 4:
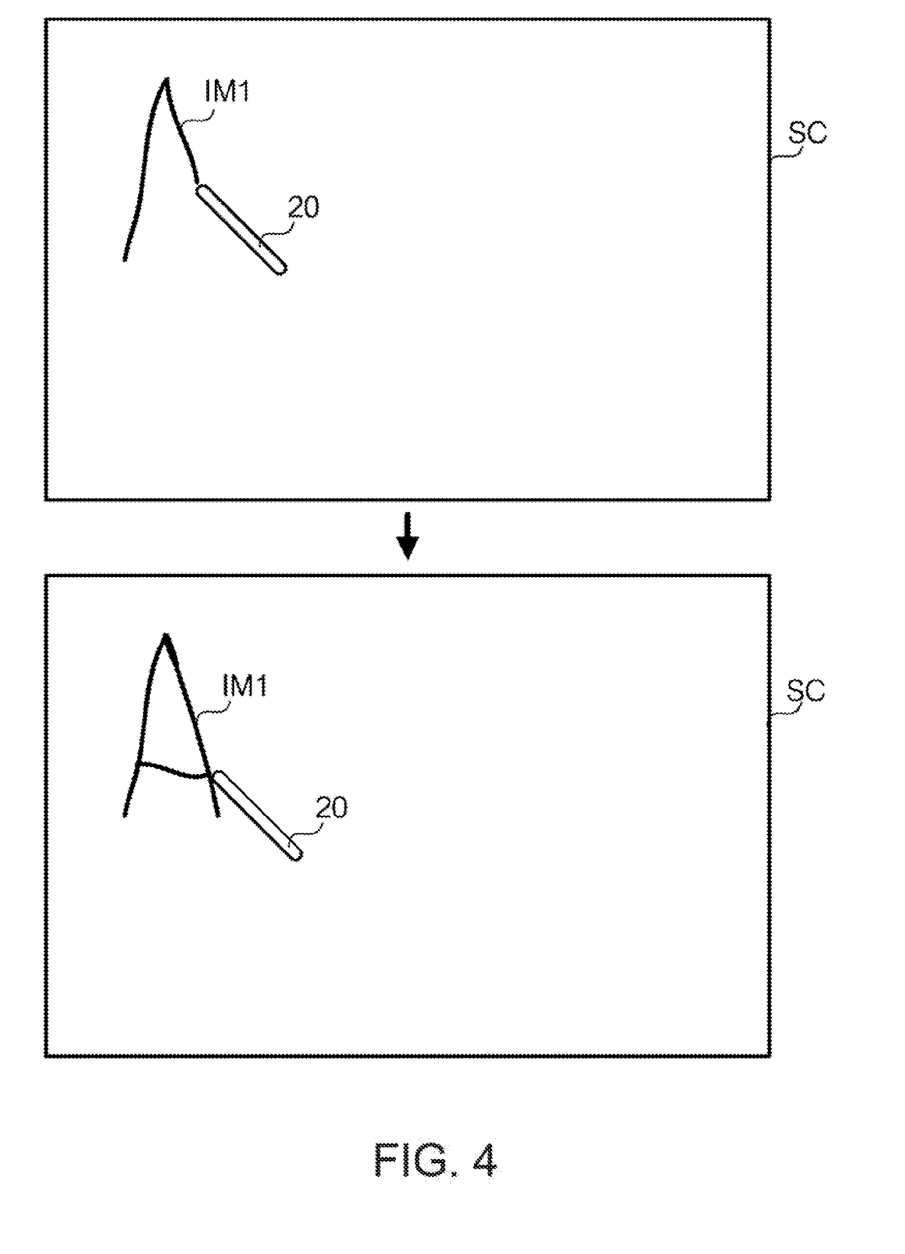
FIG. 4 is a diagram showing an overview of an interactive mode.

FIG. 4 is a diagram showing an overview of the interactive mode. The interactive mode is an operation mode in which the display apparatus 10 draws a line (hereinafter referred to as "handwritten image") corresponding to a track of the pointer 20. In the interactive mode, the display apparatus 10 can be used like a whiteboard or an electronic blackboard. Further, the display apparatus 10 can display an image obtained by superimposing the handwritten image on a video supplied from the video supply apparatus and combining the handwritten image and the video. For example, the display apparatus 10 can superimpose and display the handwritten image (in this case, an annotation or a memorandum) on a screen of an application program executed by the information processing apparatus 30. In an example shown in FIG. 4, a handwritten image IM1 is displayed on a screen SC according to a track of movement of the pointer 20 moved by the user while being kept in contact with the projection surface.

Figure 5:
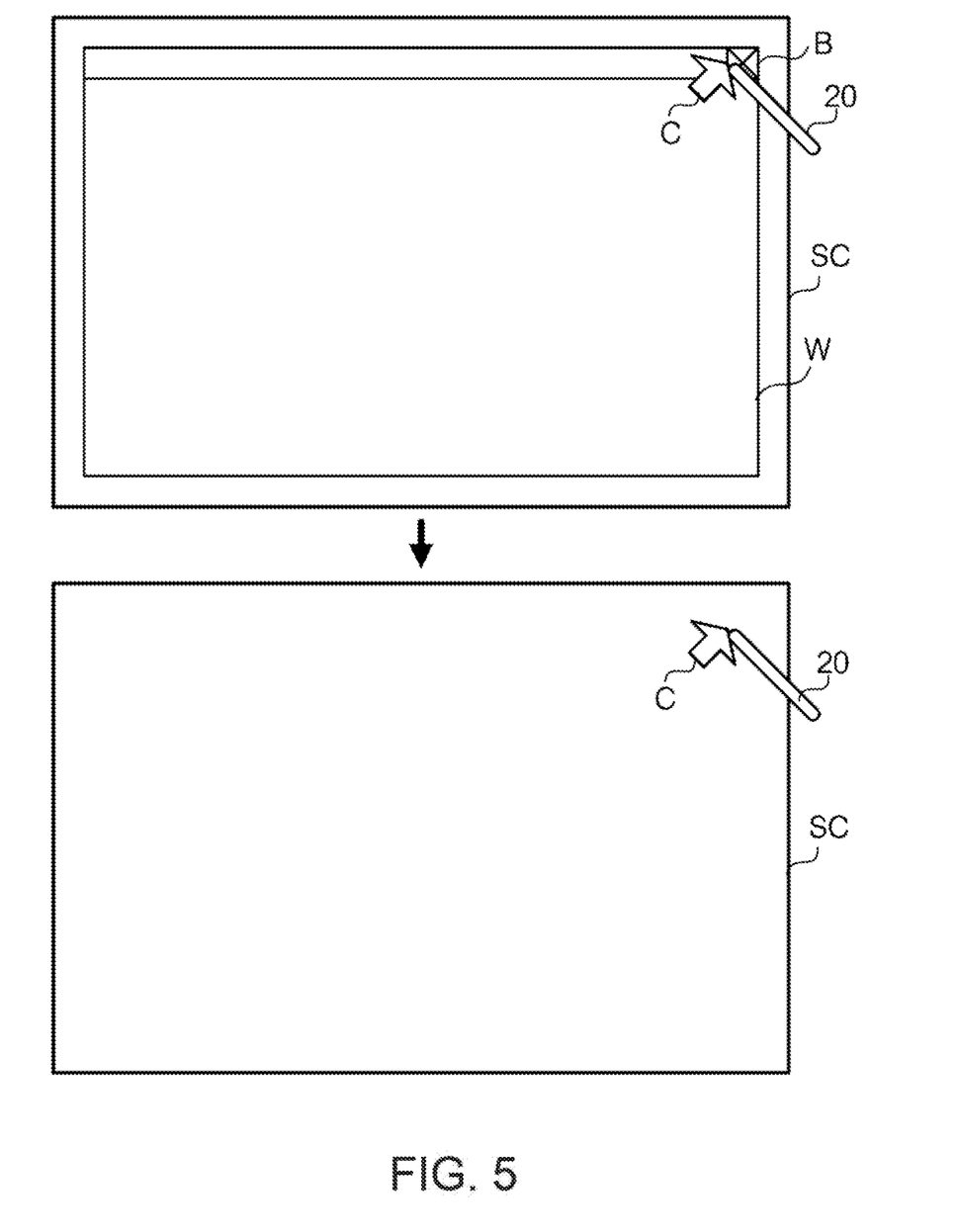
FIG. 5 is a diagram showing an overview of a PC mode.

FIG. 5 is a diagram showing an overview of the PC mode. The PC mode is an operation mode in which the pointer 20 is used as a pointing device of the information processing apparatus 30. The display apparatus 10 transmits information indicating an event including a position (a coordinate) of the pointer 20 on the projection surface to the information processing apparatus 30. A device driver of the information processing apparatus 30 converts the information transmitted from the display apparatus 10 into information concerning mouse operation and passes the information to the OS.

The display apparatus 10 displays the screen of the application program executed by the information processing apparatus 30. In this example, the screen includes a mouse cursor C and a window W of the application program. The window W includes a button B. The button B is a button for closing the window W. When the user touches the projection surface with the pointer 20, the mouse cursor C moves to a touched position. When the position touched by the user is the button B, it is interpreted that the button B is clicked. The window W closes.

3. Operation

Several operation examples of the display system 1 are explained below. The operation examples explained below may be independently used or two or more operation examples may be used in combination.

3-1. Operation Example 1

Figure 6:
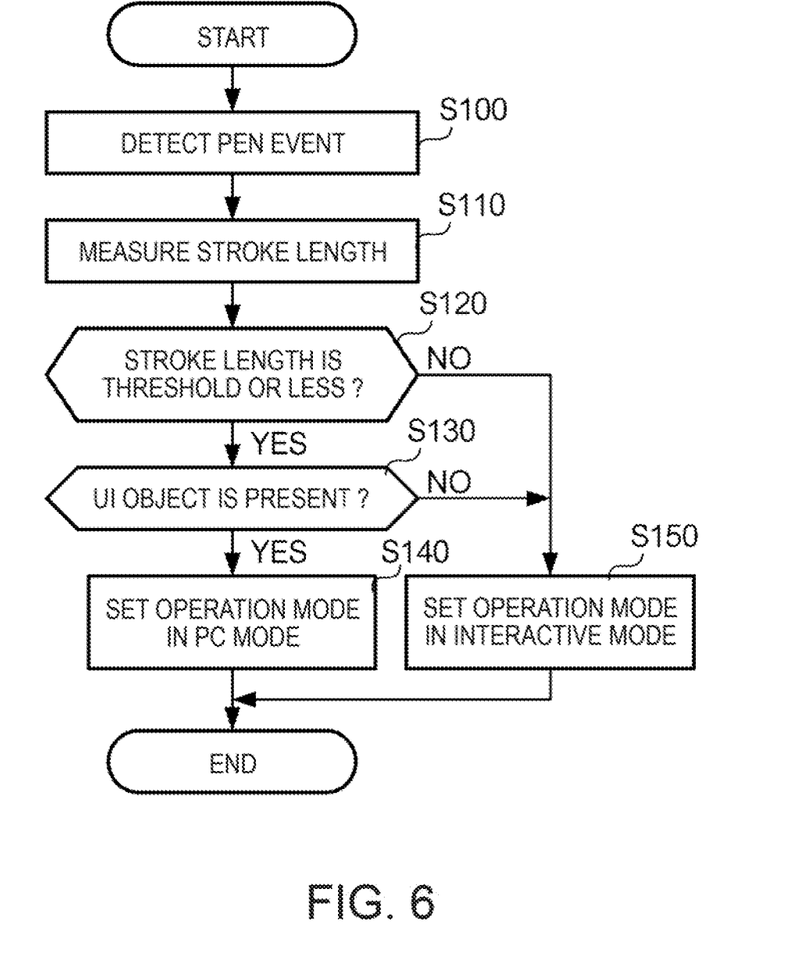
FIG. 6 is a flowchart for explaining mode switching processing according to an operation example 1.

FIG. 6 is a flowchart for explaining mode switching processing according to an operation example 1. A flow shown in FIG. 6 is started, for example, when a power supply of the display apparatus 10 is turned on. Note that, in the following explanation, software is sometimes described as an entity of processing. This means that a hardware resource (a CPU, etc.) executing the software performs processing in cooperation with the other hardware resources (a memory, a communication interface, etc.).

Note that, in step S100, the CPU 100 of the display apparatus 10 detects a pen event. Details are as explained below. The CPU 100 periodically acquires an image photographed by the camera 108. The CPU 100 specifies, from the position of a light emitting point included in the image and a change in light emission intensity, a pen event and a position where the pen event has occurred. The position is converted into a coordinate on a coordinate system based on the projection screen. The CPU 100 stores the detected pen event (including the coordinate) in the RAM 102.

When the detected pen event is the pen-up event, the CPU 100 shifts the processing to step S110. When the detected pen event is an event other than the pen-up event or when a pen event is not detected, the CPU 100 shifts the processing to step S100 again.

In step S110, the CPU 100 measures a stroke length concerning a most recent pen event. The stroke length means the length of a line corresponding to a track of the position of the pointer 20. The line corresponding to the track of the position of the pointer 20 means a line drawn using coordinates included in continuously detected pen-down events, that is, a track of movement of the pointer 20 moved while being kept in contact with the projection surface. The CPU 100 measures the stroke length concerning a line just finished being drawn (a line on which the pen-up event is just detected).

In step S120, the CPU 100 determines whether the measured stroke length is a threshold or less. The threshold is a threshold serving as a determination reference for the switching of the operation modes. In other words, the threshold is a threshold serving as a determination reference for determining whether operation of the pointer 20 by the user is operation on the UI object (the icon, the button, etc.) on the screen or operation for drawing a line. When the stroke length is smaller than the size (the height or the width) of the UI Object, the operation of the pointer 20 is likely to be an instruction input (click, etc.) to the UI object. Therefore, the threshold is set to a size as large as the size of the UI object. Note that, in this example, it is determined whether the stroke length is the threshold or less. However, it may be determined whether the stroke length is smaller than the threshold.

If determining that the stroke length is the threshold or less (YES in S120), the CPU 100 shifts the processing to step S130. If determining that the stroke length exceeds the threshold (NO in S120), the CPU 100 shifts the processing to step S150.

Step S130, the CPU 100 determines whether the UI object is present in the coordinate where the pen-up event is detected. In this example, the display apparatus 10 alone cannot determine whether the UI object is present in the coordinate. Therefore, the display apparatus 10 inquires the information processing apparatus 30, which is the video supply apparatus, whether the UI object is present in the coordinate. Details are as explained below.

The CPU 100 transmits an inquiry to the information processing apparatus 30. The inquiry may be transmitted through a route same as a route of a video signal or may be transmitted through a route different from the route of the video signal. The inquiry includes information indicating the coordinate where the pen-up event is detected.

When receiving the inquiry from the display apparatus 10, the position determining program of the information processing apparatus 30 converts the coordinate included in the inquiry into a coordinate on a desktop (the screen) of the information processing apparatus 30. The position determining program determines whether the UI object is present in the coordinate. The position determining program performs the determination by, for example, inquiring the OS whether an object responding with a click is present in the coordinate. The OS has a function of determining, when a coordinate is designated, whether an object that can be clicked is present in the coordinate. The position determining program generates, using a result of the determination, a reply to the inquiry from the display apparatus 10. The reply includes a determination result concerning whether the UI object is present in the coordinate. The position determining program transmits the generated reply to the display apparatus 10.

When receiving the reply from the information processing apparatus 30, the CPU 100 of the display apparatus 10 determines, according to the reply, whether the UI object is present in the coordinate. If determining that the UI object is present (YES in S130), the CPU 100 shifts the processing to step S140. If determining that the UI object is absent (NO in S130), the CPU 100 shifts the processing to step S150.

In step S140, the CPU 100 sets the operation mode in the PC mode. That is, the operation mode is the interactive mode to that point, the operation mode is switched to the PC mode. In this case, a most recent series of pen events (consecutive pen events from first detection of a series of pen-down events to detection of the pen-up event) are processed in the PC mode. When the operation mode is the PC mode to that point, the operation mode is maintained. After setting the operation mode, the CPU 100 ends the flow of FIG. 6.

In step S150, the CPU 100 sets the operation mode in the interactive mode. That is, when the operation mode is the PC mode to that point, the operation mode is switched to the interactive mode. In this case, a most recent series of pen events are processed in the interactive mode. When the operation mode is the interactive mode to that point, the operation mode is maintained. After setting the operation mode, the CPU 100 ends the flow of FIG. 6.

The flow of FIG. 6 is periodically repeatedly executed while the power supply of the display apparatus 10 is on. According to this operation example, the switching of the operation modes is performed reflecting the intention of the user more. Specifically, when a stroke of a line drawn by the pointer 20 is smaller than a threshold and a position where pen-up is detected is the position of the UI object, the operation mode is automatically switched to the PC mode. When the stroke is larger than the threshold, the operation mode is automatically switched to the interactive mode. Note that, even when the pen-up event is detected, the inquiry is not performed when the stroke is larger than the threshold.

An example of the determination is more specifically explained below. In the example explained below, a unit of length is a pixel. The threshold in step S120 is ten pixels. In an application program currently being executed, the UI object is displayed only in a rectangular region having a line connecting (415, 17) and (425, 27) as a diagonal line.

(1) Example 1

In this example, a touch start coordinate (a coordinate of a first pen-down event in a series of pen events) is (960, 390) and a touch end coordinate (a coordinate of the pen-up event in the series of pen events) is (960, 395). Stroke length is five pixels and smaller than the threshold. Therefore, the display apparatus 10 inquires the information processing apparatus 30 whether the UI object is present in a coordinate (960, 395). Since the UI object is absent in this coordinate, the information processing apparatus 30 transmits a reply to the effect that the UI object is absent to the display apparatus 10. When receiving the reply, the display apparatus 10 sets the operation mode in the interactive mode. That is, the information processing apparatus 30 draws a short line having length of five pixels.

(2) Example 2

In this example, the touch start coordinate is (420, 80) and the touch end coordinate is (422, 81). The stroke length is $\sqrt{5}$ pixels and smaller than the threshold. Therefore, the display apparatus 10 inquires the information processing apparatus 30 whether the UI object is present in the coordinate (422, 81). Since the UI object is present in this coordinate, the information processing apparatus 30 transmits a reply to the effect that the UI object is present to the display apparatus 10. When receiving the reply, the display apparatus 10 sets the operation mode in the PCmode. That is, a line having length of $\sqrt{5}$ pixels is not drawn. An event indicating that the coordinate (422, 81) is clicked is transmitted to the information processing apparatus 30.

3-2. Operation Example 2

Figure 7:
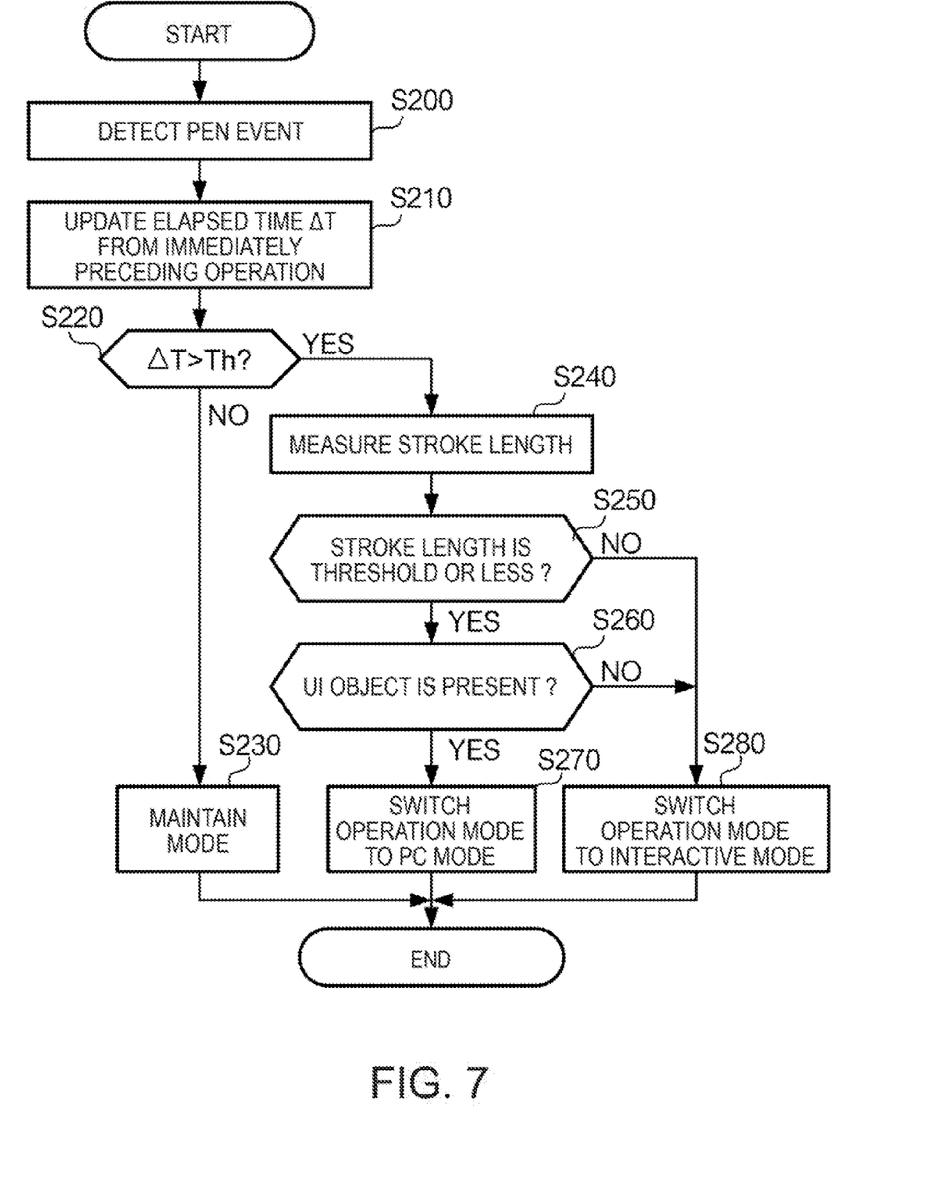
FIG. 7 is a flowchart for explaining mode switching processing according to an operation example 2.

FIG. 7 is a flowchart for explaining mode switching processing according to an operation example 2. In the operation example 1, the display apparatus 10 transmits the inquiry to the information processing apparatus 30 every time the pen-up event occurs. That is, in the operation example 1, time for waiting for communication with the information processing apparatus 30 occurs every time the pen-up event is detected. Therefore, depending on a communication situation between the display apparatus 10 and the information processing apparatus 30, it is likely that the user feels that a delay occurs.

In the operation example 2, in order to reduce the likelihood of recognition of the delay by the user, a frequency of the inquiry to the information processing apparatus 30 by the display apparatus 10 is reduced. Therefore, in the operation example 2, determination of mode switching is not performed before fixed time elapses after the last pen operation is performed. Details are as explained below.

In step S200, the CPU 100 of the display apparatus 10 detects a pen event. The CPU 100 stores the detected pen event (including a coordinate) in the RAM 102 together with time when the pen event is detected. When the detected pen event is the pen-up event, the CPU 100 shifts the processing to step S210. When the detected pen event is an event other than the pen-up event or when a pen event is not detected, the CPU 100 shifts the processing to step S200 again.

In step S210, the CPU 100 updates elapsed time ΔT from the immediately preceding pen operation. The "immediately preceding pen operation" means the pen-up event detected last time. That is, the time ΔT indicates time elapsed until a line related to the pen-up event of this time is finished being drawn after a line is finished being drawn last time. The CPU 100 updates a value of the time ΔT and writes the value in the RAM 102.

In step S220, the CPU 100 determines whether the time ΔT exceeds a threshold Th (i.e., ΔT>Th). The threshold Th is a threshold serving as a determination reference concerning whether determination of mode switching is performed. If determining that the time ΔT is the threshold Th or less (NO in step S220), the CPU 100 shifts the processing to step S230.

In step S230, the CPU 100 maintains the operation mode. Processing in steps S240 to S280 is the same as the processing in steps S110 to S150. According to this operation example, compared with when the inquiry is transmitted to the information processing apparatus 30 every time a predetermined pen event occurs, it is possible to reduce the frequency of the inquiry. That is, according to this example, for example, when the operation mode is switched from the interactive mode to the PC mode, switching to the interactive mode is not performed before the threshold time elapses later.

Note that, in the operation example 2, when the present operation mode is the interactive mode, the CPU 100 may shift to the measurement of the stroke length (step S240) skipping the determination as to whether the time ΔT exceeds the threshold Th. This is because it is less likely that an operation equivalent to click is performed in the interactive mode (it is less likely that a short dot is marked).

3-3. Operation Example 3

Figure 8:
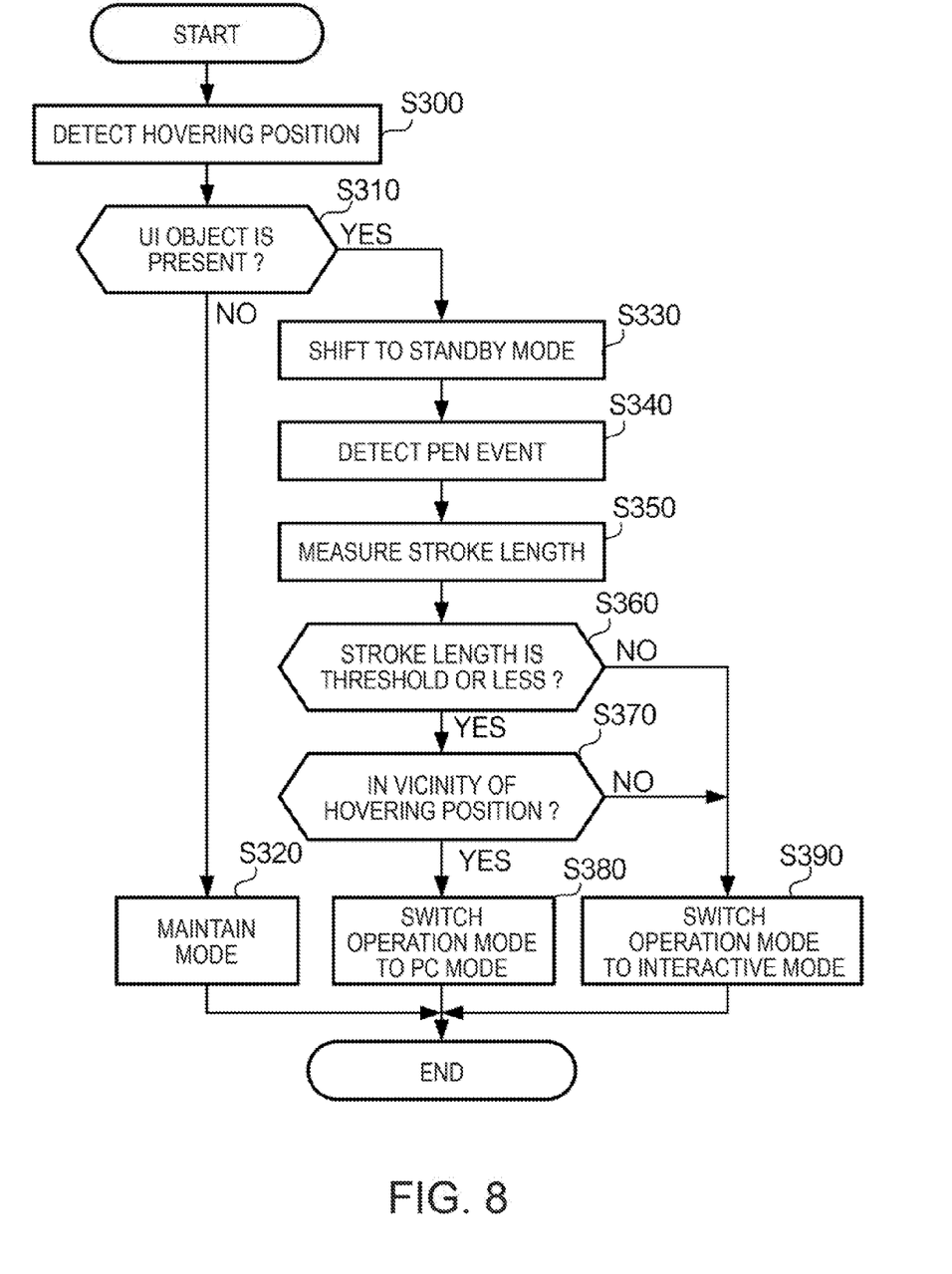
FIG. 8 is a flowchart for explaining mode switching processing according to an operation example 3.

Depending on the specific configuration of the detecting unit 12, it is sometimes possible to detect not only two states, that is, a state in which the pointer 20 touches the projection surface and a state in which the pointer 20 does not touch the projection surface, but also three states, that is, a state in which the pointer 20 touches the projection surface, a state in which the pointer 20 does not touch the projection surface but the distance to the projection surface is short (so-called hovering state), and a state in which the pointer 20 does not touch the projection surface and the distance to the projection surface is long. In the operation example 3, determination of mode switching is performed when the pointer 20 is in the hovering state.

FIG. 8 is a flowchart for explaining processing according to the operation example 3. In step S300, the CPU 100 detects a hovering event. The hovering event is an event indicating that the pointer 20 is in the hovering state. The hovering event includes information (a coordinate) indicating a position where the pointer 20 is hovering (hereinafter referred to as "hovering position"). When the hovering event is detected, the CPU 100 shifts the processing to step S310. When the hovering event is not detected, the CPU 100 shifts the processing to step S300 again.

In step S310, the CPU 100 determines whether the UI object is present in the hovering position. This determination is performed the same as the determination in step S130. If determining that the UI object is absent in the hovering position (NO in step S310), the CPU 100 shifts the processing to step S320. If determining that the UI object is present in the hovering position (YES in step S310), the CPU 100 shifts the processing to step S330.

In step S320, the CPU 100 maintains the operation mode. After determining to maintain the operation mode, the CPU 100 ends the flow of FIG. 8.

In step S330, the CPU 100 shifts the operation mode to a standby mode. The standby mode is a state in which the switching of the operation mode is put off. The standby mode means an operation mode in which both of the drawing of a line in the interactive mode and the transmission of a coordinate to the information processing apparatus 30 in the PC mode are not performed. That is, in the standby mode, a detected coordinate of the pointer 20 is only recorded as a history. Neither drawing of a line nor output of the coordinate to the information processing apparatus 30 is performed. Note that, when the operation mode is switched to the standby mode, the CPU 100 may notify the user to that effect. Examples of a method of the notification include a method of changing the shape of the mouse cursor from the shapes in the mouse mode and the interactive mode, a method of adding a visual effect (darkening, brightening, flashing, etc.) to the screen, a method of vibrating the electronic pen, and a method of generating beep sound.

In step S340, the CPU 100 of the display apparatus 10 detects a pen event. The CPU 100 stores the detected pen event (including a coordinate) in the RAM 102. When the detected pen event is the pen-up event, the CPU 100 shifts the processing to step S350. When the detected pen event is the hovering event, the CPU 100 shifts the processing to step S300. When the detected pen event is an event other than the pen-up event and the hovering event or when a pen event is not detected, the CPU 100 shifts the processing to step S340 again.

In step S350, the CPU 100 measures a stroke length concerning a most recent pen event. In step S360, the CPU 100 determines whether the measured stroke length is a threshold or less. The threshold is the same as the threshold explained in step S120. If determining that the stroke length is the threshold or less (YES in step S360), the CPU 100 shifts the processing to step S370. If determining that the stroke length exceeds the threshold (NO in step S360), the CPU 100 shifts the processing to step S390.

In step S370, the CPU 100 determines whether the coordinate where the pen-up event is detected is in the vicinity of the hovering position, that is, whether the distance between the coordinate and the hovering position is a threshold or less. The threshold is may be the same as the threshold used in step S360. If determining that the coordinate where the pen-up event is detected is in the vicinity of the hovering position (YES in step S370), the CPU 100 shifts the processing to step S380. If determining that the coordinate where the pen-up event is detected is not in the vicinity of the hovering position (NO in step S370), the CPU 100 shifts the processing to step S390.

In step S380, the CPU 100 sets the operation mode in the PC mode. After setting the operation mode, the CPU 100 ends the flow of FIG. 8.

In step S390, the CPU 100 sets the operation mode in the interactive mode. After setting the operation mode, the CPU 100 ends the flow of FIG. 8.

According to this operation example, the determination of the operation mode switching is performed prior to the touch of the pointer 20 on the projection surface. That is, the user can determine the switching of the operation modes before touching the projection surface with the pointer 20.

An example of the determination is more specifically explained below. In the example explained below, both of the thresholds in steps S360 and S370 are ten pixels. In an application program currently being executed, the UI object is displayed only in a rectangular region having a line connecting (415, 17) and (425, 27) as a diagonal line.

(1) Example 3

In this example, the hovering position is (420, 80). The display apparatus 10 inquires the information processing apparatus 30 whether the UI object is present in the coordinate (420, 80). Since the UI object is present in the coordinate, the information processing apparatus 30 transmits a reply to the effect that the UI object is present to the display apparatus 10. When receiving the reply, the display apparatus 10 sets the operation mode in the standby mode. Thereafter, the user starts a touch from a coordinate (422, 82) and separates the pointer 20 from the projection surface in the coordinate (422, 81). At this point, the stroke length is one pixel and is smaller than the threshold in step S360. Further, the distance between the coordinate of the pen-up event and the hovering position is √5 pixels and is smaller than the threshold. Therefore, the operation mode is set in the PC mode. An event indicating that the coordinate (422, 81) is clicked is transmitted to the information processing apparatus 30.

(2) Example 4

In this example, the hovering position is (420, 80). The display apparatus 10 inquires the information processing apparatus 30 whether the UI object is present in the coordinate (420, 80). Since the UI object is present in the coordinate, the information processing apparatus 30 transmits a reply to the effect that the UI object is present to the display apparatus 10. When receiving the reply, the display apparatus 10 sets the operation mode in the standby mode. Thereafter, the user starts a touch from the coordinate (422, 82) and separates the pointer 20 from the projection surface in a coordinate (500, 81). At this point, the stroke length is larger than the threshold in step S360. Therefore, the operation mode is set in the interactive mode. An image of a line corresponding to a track of the pointer 20 is drawn on the screen.

(3) Example 5

In this example, the hovering position is (420, 80). The display apparatus 10 inquires the information processing apparatus 30 whether the UI object is present in the coordinate (420, 80). Since the UI object is present in the coordinate, the information processing apparatus 30 transmits a reply to the effect that the UI object is present to the display apparatus 10. When receiving the reply, the display apparatus 10 sets the operation mode in the standby mode. Thereafter, the user starts a touch from a coordinate (425, 80) and separates the pointer 20 from the projection surface in a coordinate (431, 80). At this point, the stroke length is six pixels and is smaller than the threshold in step S360. However, the distance between the coordinate of the pen-up event and the hovering position is eleven pixels and is larger than the threshold. Therefore, the operation mode is set in the interactive mode. An image of a line corresponding to a track of the pointer 20 is drawn on the screen.

4. Modifications

The invention is not limited to the embodiment. Various modified implementations of the invention are possible. Several modifications are explained below. Two or more of the modifications may be used in combination.

4-1. Modification 1

In the operation examples 1 to 3, a combination of the pen event serving as an opportunity for measuring the stroke length (an opportunity for processing to the next processing) and the determination condition concerning the stroke length is not limited to the combination explained in the embodiment. For example, the pen event serving as the opportunity for measuring the stroke length may be the pen-down event and the pen-up event. The determination condition concerning the stroke length may be "the stroke length is larger than the threshold or the stroke length is the threshold or less at a point in time when the pen-up event is detected".

4-2. Modification 2

In the operation example 2, a pen event serving as an opportunity for shifting from step S200 to step S210 is not limited to the pen-up event. When the pen-down event is detected, the CPU 100 may shift the processing from step S200 to step S210.

4-3. Modification 3

An operation in the standby mode of the operation example 3 is not limited to the operation illustrated in the embodiment. The operation in the standby mode may be specified by a combination of four viewpoints (i) to (iv). (i) Is drawing of a line started when a first pen-down event is detected in the standby mode or is the drawing of a line put off at a point in time when the first pen-down event is detected?(ii) Is the event serving as the opportunity for the measurement of the stroke length the pen-up event or the pen-down event?(iii) Whether the next operation is performed when the stroke length is larger than the threshold or when the stroke length is smaller than the threshold?(iv) What is the "next operation" ?

Note that, in the operation example 3, (i) the drawing of a line is put off at the point in time when the first pen-down event is detected in the standby mode, (ii) the event serving as the opportunity for the measurement of the stroke length is the pen-up event, and (iii) the next operation is performed when the stroke length is shorter than the threshold. (iv) The next operation is the processing in step S370.

For example, the operation in the standby mode may be defined as an operation in which (i) the drawing of a line is started when the first pen-down event is detected in the standby mode, (ii) the event serving as the opportunity for the measurement of the stroke length is the pen-up event, (iii) the next operation is performed when the stroke length is smaller than the threshold, and (v) the next operation is erasing of a line drawn most recently (thereafter, the processing in step S370).

In another example, the operation in the standby mode may be defined as an operation in which (i) the drawing of a line is put off at the point in time when the first pen-down event is detected in the standby mode, (ii) the event serving as the opportunity for the measurement of the stroke length is the pen-down event, (iii) the next operation is performed when the stroke length is larger than the threshold, and (v) the next operation is drawing of a line related to the pen-down event being continued. In this case, the CPU 100 may start the drawing of a line from a coordinate where the stroke length exceeds the threshold or may return to a coordinate where the first pen-down event is detected and start the drawing of a line.

4-4. Modification 4

In the operation examples 1 and 2, from the first detection of the pen-down event to the determination of the operation mode for the series of pen events, the CPU 100 may shift the operation mode to the standby mode. In this case, the operation in the standby mode may be specified by a combination of four viewpoints (a) to (d). (a) Whether the drawing of a line is started when the first pen-down event is detected in the standby mode (without waiting for a reply from the information processing apparatus 30) or the drawing of a line is put off at a point in time when the first pen-down event is detected?, (b) whether the event serving as the opportunity for the measurement of the stroke length is the pen-up event or the pen-down event?, (c) what is a condition for proceeding to the next operation, and (d) what is the "next operation".

The operation in the standby mode in the operation examples 1 and 2 may be defined as an operation in which (a) the drawing of a line is started when the first pen-down event is detected in the standby mode, (b) the event serving as the opportunity for the measurement of the stroke length is the pen-up event, (c) the condition for proceeding to the next operation is a condition that a reply to the effect that the UI object is present in the coordinate of the pen up is received from the information processing apparatus 30 and the length of a drawn line is smaller than a threshold, and (d) the next operation is erasing of a line drawn most recently (thereafter, mode setting).

In another example, the operation in the standby mode in the operation examples 1 and 2 may be defined as an operation in which (a) the drawing of a line is put off at the point in time when the first pen-down event is detected in the standby mode, (b) the event serving as the opportunity for the measurement of the stroke length is the pen-down event, (c) the condition for proceeding to the next operation is a condition that the length of a line related to the pen-down event being continued (an imaginary line not drawn on the screen at a point in time of this determination) is larger than a threshold, and (d) the next operation is drawing of at least a part of the line related to the pen-down event being continued. Note that, in this case, the CPU 100 may start the drawing of a line from a coordinate where the stroke length exceeds a threshold or may return to a coordinate where the first pen-down event is detected and start the drawing of a line.

4-5. Other Modifications

The display apparatus 10 is not limited to the projector. The hardware configuration of the display apparatus 10 is not limited to the hardware configuration illustrated in FIG. 2. The display apparatus 10 may be a direct-view display apparatus such as a liquid crystal display or an organic EL display. In this case, the display apparatus includes a touch screen and detects, with the touch screen, a position pointed on the display surface.

A method with which the detecting unit 12 detects a position on the display surface and a method with which the detecting unit 12 detects an event related to the pointer 20 are not limited to the methods explained in the embodiment. The display apparatus 10 may specify the position of the pointer 20 according to a shape or a color of the pointer 20. The pointer 20 may include a button in a grip section of a housing and output a signal indicating the pen-down event when the user presses the button (in this case, the pointer 20 does not have to include the pressure sensor at the pen nib). Alternatively, a light emitting element (a laser diode, etc.) and a light receiving element (a photodiode, etc.) may be provided around the projection screen such that a beam covers the projection screen. The position and the pen event of the pointer 20 may be detected using a signal from the light receiving element.

The pointer 20 is not limited to the electronic pen. The pointer 20 may be a stylus pen including a housing of a specific shape or color or may be a finger of the user.

In the example explained in the embodiment, when the operation mode is switched to the standby mode, the user is notified to that effect. However, when the operation mode is switched to the interactive mode or the PC mode, the user may be notified to that effect. In this case, a method of the notification may be different according to the operation mode after the switching.

In the display system 1, sharing of the functions between the display apparatus 10 and the information processing apparatus 30 is not limited to the sharing of the functions illustrated in FIG. 1. At least a part of the functions illustrated in FIG. 1 may be omitted. At least a part of the functions explained as the functions of the display apparatus 10 in the embodiment may be implemented in the information processing apparatus 30. For example, the information processing apparatus 30 may have a function equivalent to the drawing unit 15. In this case, in the information processing apparatus 30, a computer program is executed, the computer program causing the information processing apparatus 30 to execute a step of displaying, with the display apparatus 10, on the display surface, a screen of an application program running on the information processing apparatus 30, a step of acquiring the position of the pointer 20 detected on the display surface, a step of determining whether the position of the pointer 20 is present within a predetermined range including a first image object for performing an input to the application program on the screen, a step of drawing, when an operation mode of the display apparatus 10 is the interactive mode, on the display surface, a line corresponding to a track of the detected position, a step of displaying, when the operation mode is the PC mode, a second image object in the detected position, and a step of switching, when the operation mode is the interactive mode, the operation mode to the PC mode when it is determined that the detected position is within the predetermined range. Note that the computer program may be provided in a state in which the computer program is stored in a computer-readable recording medium such as a magnetic recording medium (a magnetic tape, a magnetic disk (a HDD or an FD (Flexible Disk)), etc.), an optical recording medium (an optical disk (a CD (Compact Disk) or a DVD (Digital Versatile Disk)), etc.), a magneto-optical recording medium, or a semiconductor memory (a flash ROM, etc.). The computer program may be downloaded through a network such as the Internet.

What is claimed is:

1. A display apparatus comprising:
    a display section configured to display, on a display surface, a screen of an application program running on an information processing apparatus;
    a detecting section configured to detect a position of a pointer on the display surface;
    a first transmitting section configured to transmit an inquiry including information indicating the position detected by the detecting section to the information processing apparatus;
    a receiving section configured to receive, as a reply to the inquiry, a determination result concerning whether the position is present within a first range including an image object for performing an input to the application program on the screen;
    a drawing section configured to draw, when an operation mode of the display apparatus is a first mode, on the display surface, a line corresponding to a track of the position detected by the detecting section;
    a second transmitting section configured to transmit, when the operation mode is a second mode, the information indicating the position detected by the detecting section to the information processing apparatus; and
    a switching section configured to switch, when the operation mode is the first mode, the operation mode to the second mode when the receiving section receives the determination result indicating that the position detected by the detecting section is within the first range.

2. The display apparatus according to claim 1, wherein
    the detecting section detects a first event indicating that the pointer is in contact with the display surface, and
    the drawing section draws the line according to a track of the position during continuous detection of the first event, starts the drawing of the line before the receiving section receives the reply, and erases the line when the receiving section receives the determination result indicating that the position detected by the detecting section is within the first range and when a length of the line is smaller than a first threshold.

3. The display apparatus according to claim 1, wherein
    the detecting section detects a first event indicating that the pointer is in contact with the display surface, and
    the drawing section draws the line according to a track of the position during continuous detection of the first event, does not start the drawing of the line before the receiving section receives the reply, and draws at least a part of the line when a length of the line is larger than a first threshold.

4. The display apparatus according to claim 3, wherein, when the length of the line is larger than the first threshold, the drawing section returns to a point where the first event is detected first concerning the line and draws the line.

5. The display apparatus according to claim 1, wherein
    the detecting section detects a first event indicating that the pointer in contact with the display surface is separated from the display surface, and
    when the line is shorter than a first threshold at a point in time when the second event is detected, the first transmitting section transmits the inquiry when the second event is detected by the detecting section and, when the line is longer than the first threshold at the point in time when the second event is detected, does not transmit the inquiry even when the first event is detected by the detecting section.

6. The display apparatus according to claim 1, wherein the first transmitting section does not transmit the inquiry before a first time elapses after the operation mode is switched to the second mode.

7. The display apparatus according to claim 1, wherein
    the detecting section detects a first event indicating that the pointer is in contact with the display surface, and
    the switching section switches, when the operation mode is the second mode, the operation mode to the first mode when a length of a track of the position during continuous detection of the first event is larger than a first threshold.

8. The display apparatus according to claim 1, wherein
    the detecting section detects a first event indicating that the pointer is away from the display surface and a distance between the pointer and the display surface is a first threshold or less, and
    the first transmitting section transmits the inquiry when the first event is detected by the detecting section.

9. The display apparatus according to claim 1, further comprising a notifying section configured to notify a user that the operation mode is switched.

10. A display control method comprising:
    displaying, on a display surface, a screen of an application program running on an information processing apparatus;
    detecting a position of a pointer on the display surface;
    transmitting an inquiry including information indicating the detected position to the information processing apparatus;
    receiving, as a reply to the inquiry, a determination result concerning whether the position is present within a first range including an image object for performing an input to the application program on the screen;
    drawing, when an operation mode of the display apparatus is a first mode, on the display surface, a line corresponding to a track of the detected position;
    transmitting, when the operation mode is a second mode, the information indicating the detected position to the information processing apparatus; and
    switching, when the operation mode is the first mode, the operation mode to the second mode when the determination result indicating that the detected position is within the first range is received.

11. A computer program product embodied on a non-transitory computer-readable medium and comprising program instructions, which when loaded into a computer, cause the computer to execute the steps of:
    displaying, with a display apparatus, on a display surface, a screen of an application program running on the computer;
    acquiring a detected position of a pointer on the display surface;
    determining whether the position is present within a first range including a first image object for performing an input to the application program on the screen;

drawing, when an operation mode of the display apparatus is a first mode, on the display surface, a line corresponding to a track of the detected position;

displaying, when the operation mode is a second mode, a second image object in the detected position; and switching, when the operation mode is the first mode, the operation mode to the second mode when it is determined that the detected position is within the first range.

* * * * *